C. ESCHWEI.

FUR BEATING MACHINE.

APPLICATION FILED DEC. 28, 1914.

Reissued July 13, 1915.

13,944.

2 SHEETS—SHEET 1.

WITNESSES:
Jos. Bisbano.
F. Hogg.

INVENTOR
Charles Eschwei
BY Carl P. Goepel
ATTORNEY

COLUMBIA PLANOGRAPH CO., WASHINGTON, D. C.

C. ESCHWEI.

FUR BEATING MACHINE.

APPLICATION FILED DEC. 28, 1914.

Reissued July 13, 1915.

13,944.

2 SHEETS—SHEET 2.

WITNESSES:

Jos. Bisbano

Thos. J. Matthews

INVENTOR

Charles Eschwei

BY Carl P. Goepel

ATTORNEY

COLUMBIA PLANOGRAPH CO., WASHINGTON, D. C.

UNITED STATES PATENT OFFICE.

CHARLES ESCHWEI, OF COPIAGUE, NEW YORK, ASSIGNOR TO GEORGE F. ESCHWEI, OF NEW YORK, N. Y.

FUR-BEATING MACHINE.

13,944. Specification of Reissued Letters Patent. Reissued July 13, 1915.

Original No. 1,085,976, dated February 3, 1914, Serial No. 661,363. Renewed June 14, 1913, Serial No. 773,762. Application for reissue filed December 28, 1914. Serial No. 879,410.

*To all whom it may concern:*

Be it known that I, CHARLES ESCHWEI, a citizen of the United States of America, residing in Copiague, county of Suffolk, and State of New York, have invented certain new and useful Improvements in Fur-Beating Machines, of which the following is a specification.

This invention relates to an improved fur-beating machine, by means of which the lasting blows which were heretofore imparted to the beating-rods by the hand and wrist of the beater, are imitated and a beating-motion obtained by which the beating of furs left in storage is quickly and effectively accomplished by power in place of hand-operation; and for this purpose the invention consists of a fur-beating machine, which comprises a plurality of beater-rods which will be fully described hereinafter, and finally pointed out in the claims.

Figure 1:
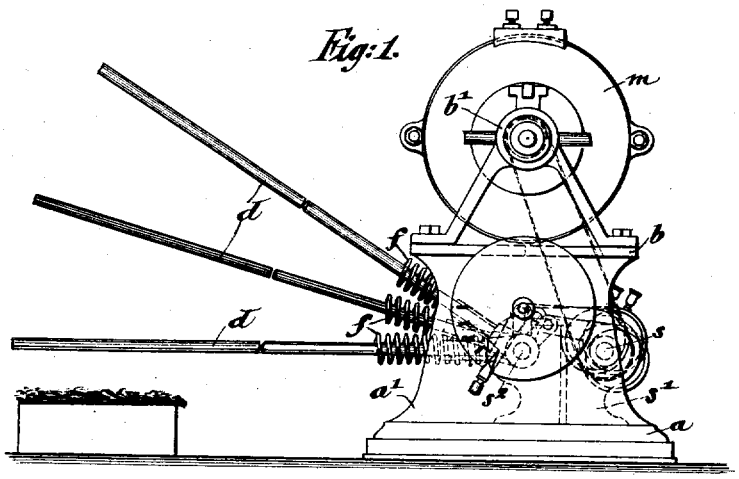
Figure 2:
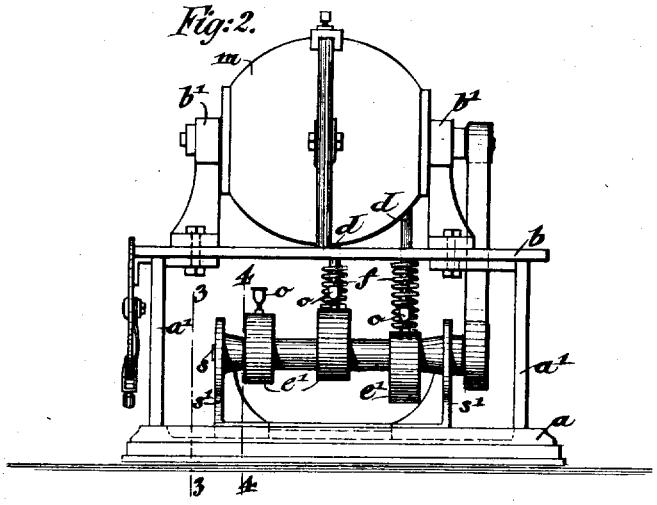
Figure 3:
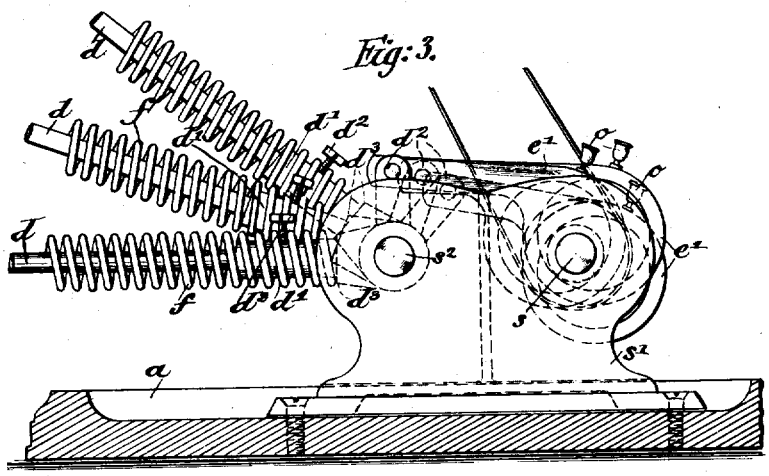
Figure 4:
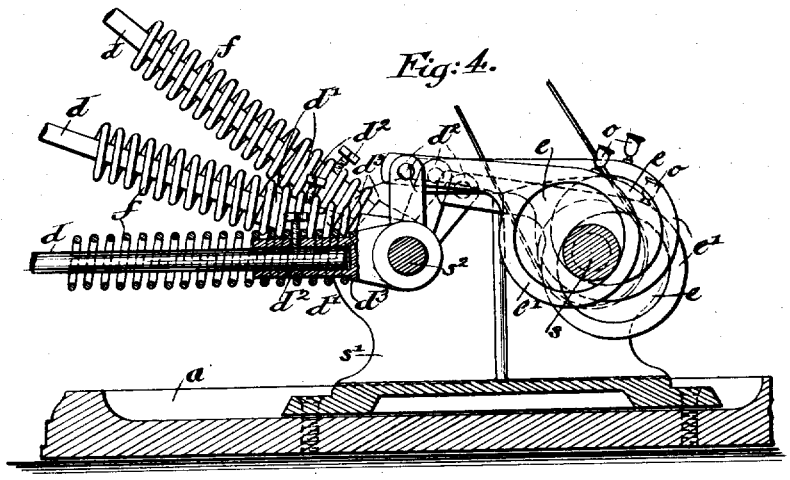

In the accompanying drawings, Figure 1 represents a side-elevation of my improved machine for beating furs, Fig. 2 is a rear-elevation thereof, showing the connection of the beating machine with an electric motor for driving the same, Fig. 3 is a side-elevation of the beaters and the driving mechanism for the same, drawn on a larger scale, and Fig. 4 is a like side-elevation with parts in vertical section.

Similar letters of reference indicate corresponding parts throughout the several figures of the drawings.

Referring to the drawings, upon the base-plate $a$ of my improved machine for beating furs, are arranged suitable standards $a^1$ which support a platform $b$ which supports by bearings $b^1$ the shaft of an electric motor $m$ of any approved construction. Belt and pulley transmission from the shaft of the electric motor serves to impart rotary motion to a driving-shaft $s$, which is supported in upright side-standards $s^1$ that are supported on the base-plate $a$. In front of the driving-shaft $s$ is arranged in suitable journal-bearings of the side-standards $s^1$ a shaft $s^2$, to which a plurality of flexible reed beater-rods $d$ are applied, by means of sockets $d^1$ mounted on the shaft $s^2$. Each socket $d^1$ is provided with a crank $d^2$ which is connected with an eccentric $e$ on the driving-shaft $s$ by a strap $e^1$ so that at each full rotation of the driving-shaft $s$ an oscillating motion of about 45°, more or less, is imparted to each beater-rod $d$. The beater-rods and the sockets for the same are so arranged relatively to the shaft $s^2$ that the beating action of the rods takes place on the article of fur, which is placed on a suitable table below the outer ends of the beater-rods, one after the other in quick succession. The eccentric straps are provided with suitable oil-cups $o$.

The inner ends of the beater-rods $d$ are inserted into the sockets $d^1$ and retained in the same by set-screws $d^5$. Against the shoulder $d^3$ of each socket $d^1$ abuts a strong helical spring $f$, which is of considerably greater length than the socket $d^1$ so as to extend well over the inner end of the beater-rod, as shown in Figs. 3 and 4. The spring is held in position against the shoulder $d^3$ and prevented from shifting on the socket and inner end of the beater-rod by the set-screw $d^5$ and is made of somewhat larger diameter than the beater-rod so as to give a certain space in the same before the spring acts on the rod and imparts a spring-action to the same similar to the yielding action of a beater-rod actuated by manual operation. To the outer end of each beater-rod is thus imparted a yielding and elastic motion, which approaches closely the motion imparted to a beater-rod by the hand and by which furs and articles of fur are quickly beaten and cleared from dust before the furs are worked up into garments or articles of fur, placed in cold-storage or delivered to the owner of the articles. A large quantity of furs and fur articles can thereby be beaten and cleaned of dust in a very quick and effective manner and expensive hand-labor for this purpose is dispensed with.

I claim:—

1. A fur-beating machine comprising a plurality of beater-rods, a shaft, sockets mounted on said shaft in which the beater-rods are supported, helical springs placed on the sockets and extending beyond the same around the portions of the beater-rods projecting from the sockets, and means for transmitting oscillatory motion to the beater-rods.

2. A fur-beating machine comprising a plurality of beater-rods, a shaft, sockets mounted on said shaft in which the beater-rods are supported, helical springs placed on the sockets and extending beyond the same around the portions of the beater-rods projecting from the sockets, means for retaining said springs on the sockets, and means for transmitting oscillatory motion to the beater-rods.

3. A fur-beating machine, comprising a plurality of beater-rods, means supporting the beater-rods, helical springs extending around portions of the beater-rods and from their point of support, and means imparting oscillatory motion to the beater-rods.

In testimony, that I claim the foregoing as my invention, I have signed my name in presence of two subscribing witnesses.

CHARLES ESCHWEI.

Witnesses:
C. P. GOEPEL,
JOS. BESBORN.

Copies of this patent may be obtained for five cents each, by addressing the "Commissioner of Patents. Washington, D. C."